Nov. 1, 1938.                C. F. HAUSE                 2,134,874
                      VALVE HANDLE SECURING DEVICE
                           Filed May 18, 1936
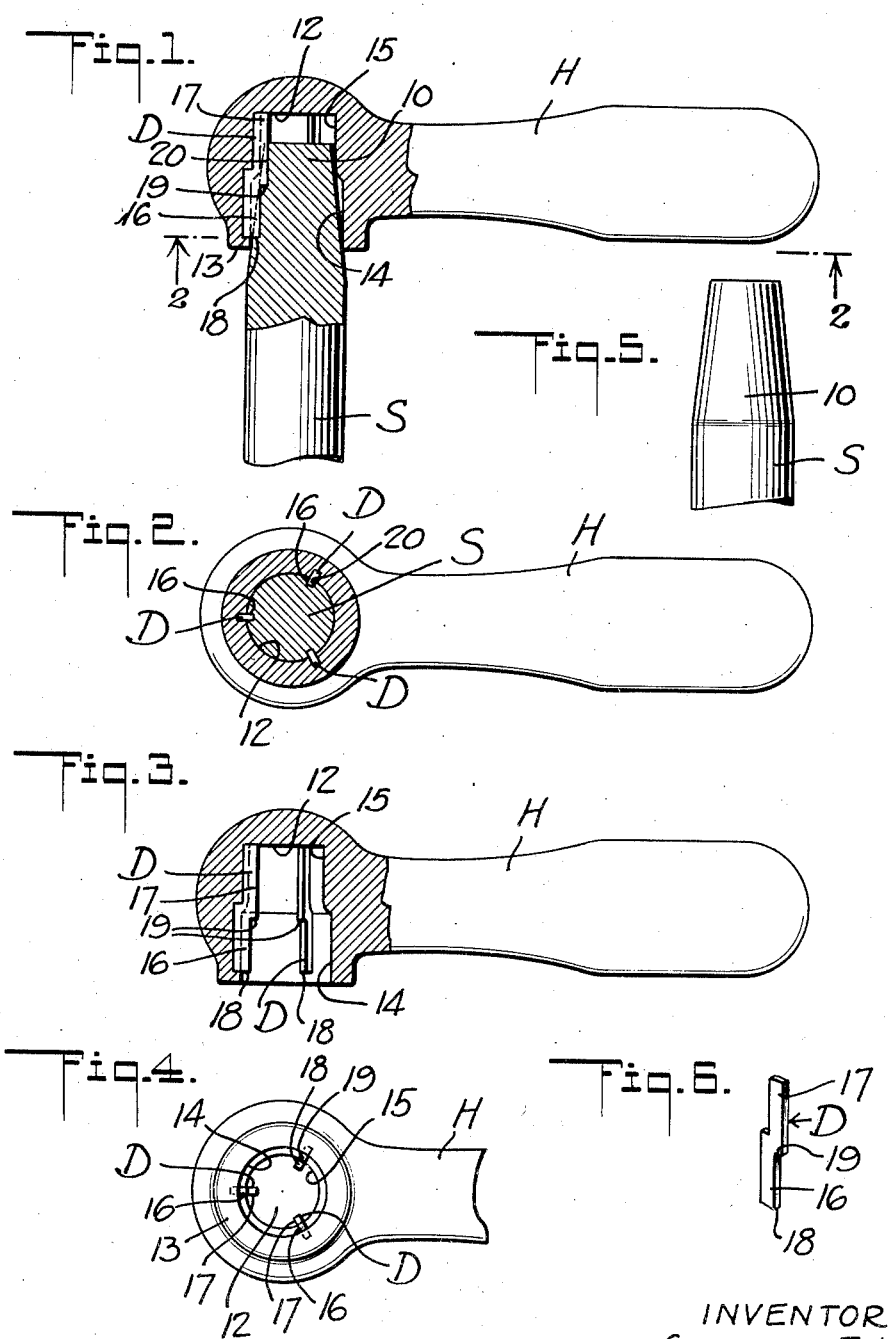
INVENTOR
CHARLES F. HAUSE
BY
Anderson & Liddy
ATTORNEYS Patented Nov. 1, 1938

2,134,874

UNITED STATES PATENT OFFICE 2,134,874

VALVE HANDLE SECURING DEVICE

Charles F. Hause, Los Angeles, Calif.

Application May 18, 1936, Serial No. 80,286

2 Claims. (Cl. 287—53)

This invention relates generally to means for securing one element to another and more particularly to devices for securing handles to the stems of valves.

An object of the invention is to provide simple and substantial means which in one of its many uses enables a handle to be rigidly secured to the stem of a valve by the simple operation of forcing or driving the handle upon the stem, all in such manner as to dispense with all extraneous and exposed fastening devices.

Another object of the invention is to provide securing means of the above described general character which routs or grooves the valve stem in a longitudinal direction during the assembling operation under the action of one or more die members constructed from a material harder than that of the valve stem, and which results in the formation of a keyed or splined connection between the handle and stem rigidly connecting the two and positively insuring rotation of the stem by the handle.

A further object of the invention is to provide valve handle securing means wherein the die member or members, as the case may be, are structurally characterized to function effectively with respect to valve stems of different diameters in a manner to greatly extend the range of use of a single size of the device.

With these and other objects in view, the invention consists in the following combinations and arrangements of elements as set forth in the following specification and particularly pointed out in the appended claims.

In the accompanying drawing,

Figure 1 is a view showing in side elevation and partly in central longitudinal section a handle applied to the end of a valve stem;

Figure 2 is a sectional view taken on the line 2—2 of Figure 1;

Figure 3 is a view similar to Figure 1, but omitting the valve stem;

Figure 4 is a fragmentary bottom plan view of the handle shown in Figure 3;

Figure 5 is a view in side elevation of the end portion of a valve stem before the handle is applied thereto;

Figure 6 is a perspective view of a die member embodied in the invention.

Referring specifically to the drawing, the invention is shown associated with a valve handle H cast or otherwise constructed of a suitable material preferably metal, and a valve stem S the end portion of which is smooth and preferably tapered to decrease in diameter towards such end as indicated at 10. The hub 11 of the handle is provided with a transverse cylindrical bore 12 opening to the flat face 13 forming one end of the hub, and this bore is stepped so as to be of two different diameters as indicated by 14 and 15 forming continuations of each other and with the portion 14 of larger diameter forming the entrance end of the bore.

Embedded or otherwise permanently fixed in the handle so as to project radially from the cylindrical wall of the bore 12 into the latter, are one or more die members D. In the present instance three of the members D are shown as being equally spaced circumferentially around the bore, but it is to be understood that a greater or lesser number of members can be provided as desired.

The die members D are in the form of bars or strips of steel or other metal harder than the metal from which the valve stem S is constructed, so as to be capable of functioning to gouge or rout the metal of the stem in a manner to be later described. The members D preferably extend longitudinally or axially of the bore 12 and are stepped along their inner longitudinal edges to provide keyed portions 16 and 17 disposed at different distances radially from the axis of the bore 12. The ends of these portions facing the open end of the bore 12 define routing or gouging edges 18 and 19, and it is to be noted that the members are spaced a short distance from the open end of the bore 12 to facilitate entrance and centering of the tapered end 10 of the valve stem S into the bore before making contact with the leading cutting edges 18.

The operation of the invention is as follows: Assuming that the diameter of the valve stem S approximates that of the larger portion of the bore 12, the free end of the stem will readily enter the portion 12 until the edges 18 strike the surface of the tapered portion 10 at some point along its length, upon applying the handle manually to the stem.

By the use of a cushioned or relatively soft faced hammer or other tool, the closed end of the hub 11 is struck one or more blows axially of the hub in the direction of the stem while holding the handle substantially at a right angle to the stem, thus causing first the edges 18 and then the edges 19 of the relatively hard die members to rout or gouge out metal from the stem as the driving operation proceeds, thereby producing keyways 20 in the stem in which the keying portions 16 and 17 are tightly jammed, whereby to rigidly secure the handle on the stem.

The provision of the edges 18 and 19 at different points along the length of the bore and at different distances radially from the axis thereof, renders the handle applicable to valve stems of different diameters within a reasonable range, thus materially extending the use of a single size of the invention.

What is claimed is:

1. A body having a bore; and a plurality of die members in the form of relatively thin bars fixed in the body at circumferentially spaced points to extend longitudinally of and to project into said bore so as to provide circumferentially spaced keying portions substantially parallel to the axis of the bore; said portions having gouging edges at spaced points along the length of said bore and at such different distances radially from the axis thereof as to co-act with stems of different diameters in gouging keyways therein in which said portions are received upon driving the body onto a stem.

2. A body having a cylindrical stem receiving bore stepped intermediate its ends to define cylindrical portions of different diameters, the larger of which is at the entrance end of the bore; a plurality of die members in the form of relatively thin bars fixed in the body at circumferentially spaced points to respectively project into said portions of the bore and provide keying portions substantially parallel to the axis of the bore; the die members being stepped intermediate their ends to provide gouging edges thereat and at the entrance end of the bore, which edges are at such different distances radially from the axis of the bore as to respectively co-act with stems of different diameters in gouging keyways therein in which the respective keying portions are received upon driving the body onto a stem.

CHARLES F. HAUSE.